3,079,396
PROCESS FOR MAKING N-VINYL-5-METHYL-2-OXAZOLIDINONE AND 5-METHYL-2-OXAZOLIDINONE
Wilhelm E. Walles, Midland, Mich., assignor to The Dow Chemical Company, Midland, Mich., a corporation of Delaware
No Drawing. Filed Oct. 17, 1961, Ser. No. 145,757
4 Claims. (Cl. 260—307)

This invention concerns a method for preparing N-vinyl-5-methyl-2-oxazolidinone, hereinafter referred to as VOM, and 5-methyl-2-oxazolidinone, hereinafter referred to as OM.

The preparation of N,N'-ethylidene-bis(5-methyl-2-oxazolidinone), hereinafter referred to as N,N'-EBOM, is disclosed in U.S. patent applications, Serial Nos. 27,286 and 98,304, filed May 2, 1960, and March 27, 1961, respectively. It may also be prepared by condensing OM and acetaldehyde in aqueous hydrochloric acid solution similar to the analogous process in Monatshefte, 87, 367–8 (1956).

It has now been discovered that N,N'-EBOM can be split into VOM and OM by heating it in an inert atmosphere, e.g., of nitrogen, carbon dioxide, argon, etc., in the presence of a basic catalyst to a temperature of about 150° C. and thereafter up to a temperature of about 250° C. under a vacuum of about 2 to about 100 mm. mercury gage. A distillate of VOM and OM is thereby obtained which is readily separated by fractional distillation, since VOM has a lower boiling point than OM. Alternatively, the N,N'-EBOM and basic catalyst can be directly heated up to 250° C. while vacuum is applied to distill products VOM and OM.

As basic catalysts are used strongly basic amines, i.e., primary, secondary and tertiary alkylamines having 1 to 5 carbon atom substituent groups, e.g., methyl-, ethyl-, propyl-, butyl- and amylamines, dimethylamine, methylethylamine, methylbutylamine, trimethylamine, dimethylethylamine, tributylamine; primary, secondary and tertiary alkyl arylamines having 1 to 5 carbon alkyl group nuclear and/or N-susbtituents, e.g., ar-methylaniline, ar-dimethylaniline, ar-butylaniline, ar-dimethylethylaniline, ar-trimethylaniline, N,N-dimethylaniline; alkylpyridines having from 1 to 3 nuclear alkyl group substituents containing 1 to 5 carbon alkyl groups, e.g., methylpyridine, dimethylpyridine, trimethylpyridine; and weakly basic metal oxides, i.e., the metallic oxides except those of the alkali metals and the alkaline earth metals, but including magnesium oxide, e.g., zinc oxide, cadmium oxide, mercuric oxide, aluminum oxide, silver oxide, cupric oxide, ferric oxide and the like.

In the case of gaseous amines, they are heated together with reactant N,N'-EBOM under pressure up to 150° C., followed by vacuum distillation at a temperature up to 250° C., as before. Alternatively, a stream of gaseous amine can be passed through the reactant mixture to maintain basicity.

When a weakly basic metal oxide catalyst is used, e.g., aluminum oxide, one can pass a feed of N,N'-EBOM through a column thereof heated to 150° C. and thereafter distill effluent VOM and OM as before. Since the catalyst is not used up, the amount of it is not critical. Generally from 1 to 10 weight percent of basic catalyst, N,N'-EBOM basis, and preferably 2 to 3 weight percent of catalyst is used.

In the practice of this invention, it is not necessary to start with a pure N,N'-EBOM. On the contrary, it is economically advantageous to start with a crude reaction mixture of N,N'-EBOM and OM, advantageously containing about 50 weight percent of the latter, such as is obtained in the condensation of excess OM with acetaldehyde by the method wherein OM is substituted for 2-pyrrolidone in the condensation with acetaldehyde; Monatshefte, 87, 367–8 (1956). The addition of base, heating and distilling under reduced pressure follow as outlined above. Other crude solutions of N,N'-EBOM, prepared by other methods, can also be processed advantageously according to the method of this invention.

Obviously, it would be advantageous, and it is within the scope of this invention, to recycle by-product OM for conversion into more N,N'-EBOM by reaction with acetaldehyde and subsequent processing pursuant to the method outlined above.

The following examples described completely representative specific embodiments of the invention claimed and are not to be considered limitative thereof.

*Example 1*

A quantity of 22.5 g. pure N,N'-EBOM and 2.5 g. γ-collidine, as basic catalyst, were melted together at 150° C. under nitrogen in a distillation flask set-up. Vacuum was then applied (18 mm. mercury gage) and the reaction flask was gradually heated up to 250° C.

A distillate was obtained in amount of 12 g., which was found by titration with bromine to contain 22.9% VOM. Infrared analysis of the distillate showed about 25% VOM and about 25% OM. The remainder of the distillate was unconverted N,N'-EBOM which is recycled. The VOM and OM are separated by fractional distillation in the usual way.

The procedure of Example 1, when repeated substituting any of the amines listed above in place of γ-collidine, gives advantageous results.

*Example 2*

A quantity of 22.5 g. pure N,N'-EBOM and 2.5 g. zinc oxide was heated under a vacuum of 3 mm. mercury gage, and at a pot temperature going gradually to 250° C. Almost no residue remained in the pot.

The distillate was found by titration to contain 9.1% VOM. Infrared analysis of the distillate showed 10% VOM and 10% OM, the remainder being unconverted N,N'-EBOM.

The procedure of Example 2, when repeated substituting one of the metal oxides listed above in place of zinc oxide, gives similar advantageous results.

What is claimed is:

1. Method for preparing N-vinyl-5-methyl-2-oxazolidinone and 5-methyl-2-oxazolidinone from N,N'-ethylidene-bis(5-methyl-2-oxazolidinone) by heating the latter in the presence of a basic compound of the group consisting of strongly basic amines and weakly basic metal oxides to a temperature of 150° C. and thereafter under reduced pressure up to a temperature of about 250° C. whereby the N,N'-ethylidene-bis(5-methyl-2-oxazolidinone) is split into N-vinyl-5-methyl-2-oxazolidinone and 5-methyl-2-oxazolidinone which are distilled off.

2. The method of claim 1 wherein the basic compound is γ-collidine.

3. The method of claim 1 wherein the basic compound is zinc oxide.

4. Method for preparing N-vinyl-5-methyl-2-oxazolidinone and 5-methyl-2-oxazolidinone from N,N'-ethylidene-bis(5-methyl-2-oxazolidinone) by heating the latter in the presence of a basic compound of the group consisting of strongly basic amines and weakly basic metal oxides up to a temperature of 250° C. under reduced pressure to split the N,N'-ethylidene-bis(5-methyl-2-oxazolidinone) and to distill off N-vinyl-5-methyl-2-oxazolidinone and 5-methyl-2-oxazolidinone.

No references cited.